United States Patent
Yokoi et al.

(10) Patent No.: US 11,112,779 B2
(45) Date of Patent: Sep. 7, 2021

(54) COMPUTER SYSTEM AND FACILITY MONITORING METHOD

(71) Applicant: Hitachi, Ltd., Tokyo (JP)

(72) Inventors: Akinori Yokoi, Tokyo (JP); Itoe Akutsu, Tokyo (JP); Kana Oki, Tokyo (JP); Yoshiaki Kato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 194 days.

(21) Appl. No.: 16/445,804

(22) Filed: Jun. 19, 2019

(65) Prior Publication Data

US 2020/0272133 A1    Aug. 27, 2020

(30) Foreign Application Priority Data

Feb. 21, 2019   (JP) .............................. JP2019-029307

(51) Int. Cl.
*G05B 19/418*    (2006.01)
*G05B 19/042*    (2006.01)

(52) U.S. Cl.
CPC ..... *G05B 19/4184* (2013.01); *G05B 19/0425* (2013.01); *G05B 19/41865* (2013.01); *G05B 2219/32021* (2013.01); *G05B 2219/37348* (2013.01)

(58) Field of Classification Search
CPC ............ G05B 19/4184; G05B 19/0425; G05B 19/41865; G05B 2219/32021; G05B 2219/37348

USPC ......................................................... 700/108
See application file for complete search history.

(56) References Cited

U.S. PATENT DOCUMENTS

| | | | |
|---|---|---|---|
| 2009/0088875 A1* | 4/2009 | Baier | G05B 19/41865 700/83 |
| 2012/0084031 A1* | 4/2012 | Saito | G05B 19/4184 702/62 |
| 2016/0282858 A1* | 9/2016 | Michalscheck | F16K 35/00 |
| 2019/0236370 A1* | 8/2019 | Man | G05B 19/41875 |

FOREIGN PATENT DOCUMENTS

JP          2010-262627 A      11/2010

* cited by examiner

*Primary Examiner* — Robert A Cassity
(74) *Attorney, Agent, or Firm* — Crowell & Moring LLP

(57) ABSTRACT

A facility that includes machines, includes a camera generating facility operation data, which includes an image of any given space. A computer system comprises: a data obtaining module obtaining the facility operation data; a work identification module identifying work that is performed in the facility, based on the image included in the facility operation data; and an output module outputting time-series information indicating a flow of the work. The work identification module identifies an object included in the image; identifies the work based on information about the identified object; and generates work analysis data, which associates the identified work, a period in which the identified work has been performed, and machines that is related to the identified work with one another. The output module outputs the time-series information or statistical information by using the work analysis data.

10 Claims, 14 Drawing Sheets

| TIME | SENSOR ID | TYPE | MONITORING DATA |
|---|---|---|---|
| 2018/2/12 12:00:00 | S1 | SOUND | 1.11 |
| 2018/2/12 12:00:00 | A1 | CURRENT | 4.01 |
| 2018/2/12 12:00:00 | C1 | IMAGE | xxxx01.jpg |
| 2018/2/12 12:00:01 | S1 | SOUND | 2.41 |
| 2018/2/12 12:00:02 | A1 | CURRENT | 5.55 |
| 2018/2/12 12:00:02 | S1 | SOUND | 3.33 |
| 2018/2/12 12:00:03 | S1 | SOUND | 3.12 |
| 2018/2/12 12:00:04 | A1 | CURRENT | 6.22 |
| 2018/2/12 12:00:04 | S1 | SOUND | 3.01 |
| 2018/2/12 12:00:05 | S1 | SOUND | 2.63 |
| 2018/2/12 12:00:05 | C1 | IMAGE | xxxx02.jpg |
| ⋮ | ⋮ | ⋮ | ⋮ |

FIG. 2

| SENSOR ID | MACHINE |
|---|---|
| S1 | M1,M3 |
| S2 | M1,M2 |
| S3 | M3 |
| ⋮ | ⋮ |
| A1 | M1 |
| ⋮ | ⋮ |
| C1 | M1 |
| ⋮ | ⋮ |

FIG. 3

| ID | MACHINE | WORK | DETERMINATION CRITERION | PRIORITY |
|---|---|---|---|---|
| 1 | M1 | RUNNING | EVENT DATA 1; | 1 |
| 2 | M1 | SHUTDOWN | DETECTION OF OBJECT 1 (C1); | 2 |
| 3 | M1 | PANEL OPERATION | DISTANCE BETWEEN OBJECTS 2 AND 3 (C1) > THRESHOLD 2; | 3 |
| 4 | M1 | TOOL REPLACEMENT | DISTANCE BETWEEN OBJECTS 2 AND 4 (C1) > THRESHOLD 3; | 4 |
| 5 | M1 | CLEANING | DISTANCE BETWEEN OBJECTS 2 AND 5 (C1) > THRESHOLD 4; | 5 |
| 6 | M1 | CLEANING | EVENT DATA2; | 6 |
| ⋮ | ⋮ | ⋮ | ⋮ | ⋮ |
| i | M2,M3 | RUNNING | EVENT DATAi; DETECTION OF OBJECT i; | 1 |
| i+1 | M2,M3 | SHUTDOWN | DETECTION OF OBJECT i+1 (C3); | 2 |
| i+2 | M2,M3 | SHUTDOWN | DETECTION OF OBJECT i+2 (C2); | 3 |
| ⋮ | ⋮ | ⋮ | ⋮ | ⋮ |

*FIG. 4*

| ID | MACHINE | WORK | PERIOD | SENSOR ID |
|---|---|---|---|---|
| 1 | M1 | RUNNING | 2018/2/12 00:00:00-2018/2/12 12:00:00 | S1,S2,A1,C1 |
| 2 | M1 | PREPARATION | 2018/2/12 12:00:00-2018/2/12 13:00:00 | S1,S2,A1,C1 |
| 3 | M1 | RUNNING | 2018/2/12 13:00:00-2018/2/12 15:00:00 | S1,S2,A1,C1 |
| 4 | M1 | CHECK | 2018/2/12 15:00:00-2018/2/12 15:45:00 | S1,S2,A1,C1 |
| 5 | M1 | CLEANING | 2018/2/12 15:45:00-2018/2/12 18:00:00 | S1,S2,A1,C1 |
| 6 | M1 | RUNNING | 2018/2/12 18:00:00-2018/2/13 03:00:00 | S1,S2,A1,C1 |
| 7 | M2,M3 | RUNNING | 2018/2/11 18:00:00-2018/2/12 03:00:00 | S1,S2,S3,A2,C2,C3 |
| 8 | M2,M3 | SHUTDOWN | 2018/2/12 03:00:00-2018/2/12 06:00:00 | S1,S2,S3,A2,C2,C3 |
| 9 | M2,M3 | PREPARATION | 2018/2/12 06:00:00-2018/2/12 08:30:00 | S1,S2,S3,A2,C2,C3 |
| ⋮ | ⋮ | ⋮ | ⋮ | ⋮ |

FIG. 5

| MACHINE | WORK RATE (DAILY BASIS) |
|---|---|
| M1 | 53% |
| M2 | 48% |
| ⋮ | ⋮ |

| MACHINE | SCHEDULE ||
| :---: | :---: | :---: |
| | WORK SPECIFICS | PERIOD |
| M1 | RUNNING | 2018/2/12 00:00:00-<br>2018/2/12 12:00:00 |
| | PREPARATION | 2018/2/12 12:00:00-<br>2018/2/12 13:00:00 |
| | RUNNING | 2018/2/12 13:00:00-<br>2018/2/12 15:00:00 |
| | CHECK | 2018/2/12 15:00:00-<br>2018/2/12 15:45:00 |
| | ⋮ | ⋮ |
| ⋮ | ⋮ | ⋮ |

| TIME | MACHINE | ALERT TYPE | CAUSE | MEASURE |
| :---: | :---: | :---: | :---: | :---: |
| 2016/1/5 04:33:21 | M1 | DROPPED OPERATING RATE | CLEANING TIME OVERRUN | INSTALL COVER |
| ⋮ | ⋮ | ⋮ | ⋮ | ⋮ |

COMPUTER SYSTEM AND FACILITY MONITORING METHOD

CLAIM OF PRIORITY

The present application claims priority from Japanese patent application JP 2019-29307 filed on Feb. 21, 2019, the content of which is hereby incorporated by reference into this application.

BACKGROUND OF THE INVENTION

This invention relates to a technology of monitoring a running state of a facility that includes a plurality of pieces of equipment.

Productivity improvement is an issue in a manufacturing factory and other facilities in which various machines run. It is important to keep track of a running state of a facility in order to improve productivity. A technology described in JP 2010-262627 A, for example, is known as a technology of keeping track of a running state of a facility.

In JP 2010-262627 A, there is included a description "An equipment running state measurement apparatus 1 includes a power data obtaining unit 12 configured to obtain a consumed power of equipment 10a, which varies depending on a running state of the equipment 10a, a running state determination unit 7 configured to determine the running state of the equipment 10a from the consumed power as one of at least two states: an active state and a shutdown state, a cause input unit 9 configured to receive input of a cause of shutdown of the equipment 10a from a worker with respect to the shutdown state that is determined by the running state determination unit 7, and configured to set a shutdown cause for this shutdown state based on the input, and a multiplication unit 6 configured to obtain, for each shutdown cause, a power consumption amount by multiplying a period for which the relevant shutdown state has lasted by the consumed power in the period for which the relevant shutdown state has lasted, and is accordingly capable of measuring, for each cause of shutdown of the equipment 10a, a duration time of the shutdown state and a power consumption amount".

SUMMARY OF THE INVENTION

The technology described in JP 2010-262627 A enables the user to keep track of the state of equipment (a machine). In JP 2010-262627 A, however, the cause of the shutdown state and other types of information are required to be manually input, which means a heavy burden on the user and possibilities of a missed input and an incorrect input. The technology described in JP 2010-262627 A is also for monitoring the state of equipment (a machine) and is not a technology of automatically monitoring work that is related to the running of a facility. Automatic and precise identification of work unrelated to the state of a machine, for example, the operation of an operation panel, cleaning, and parts replacement, is beyond the capabilities of the technology described in JP 2010-262627 A.

The technology described in JP 2010-262627 A is consequently incapable of monitoring the running state of the entire facility with precision without burdening a user.

A representative example of the present invention disclosed in this specification is as follows: a computer system, which is configured to monitor a running state of a facility that includes a plurality of machines, the facility including at least one camera, the at least one camera being configured to generate first facility operation data, which includes an image of any given space, the computer system comprising: a data obtaining module configured to obtain the first facility operation data; a work identification module configured to identify work that is performed in the facility, based on the image included in the first facility operation data; and an output module configured to output information that is generated based on a result of processing of the work identification module. The work identification module is configured to: identify an object included in the image to generate first analysis data, which includes information about the object; identify the work based on the first analysis data; and generate work analysis data, which associates the identified work, a period in which the identified work has been performed, and at least one of the plurality of machines that is related to the identified work with one another. The output module is configured to output at least one of time-series information that indicates a flow of the work related to one of the plurality of machines, or statistical information of the work related to the one of the plurality of machines, by using the work analysis data.

According to this invention, the running state of the entire facility can be monitored with precision without burdening a user. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 2 is a table for showing an example of the data structure of facility operation data management information in the first embodiment;

FIG. 3 is a table for showing an example of the data structure of facility management information in the first embodiment;

FIG. 4 is a table for showing an example of the data structure of determination criterion information in the first embodiment;

FIG. 5 is a table for showing an example of the data structure of work analysis information in the first embodiment;

FIG. 14 is a diagram for illustrating a configuration example of a computer system according to a fourth embodiment;

FIG. 15A and FIG. 15B are each a table for showing an example of the data structure of production plan information in the fourth embodiment;

FIG. 16 is a table for showing an example of the data structure of measure performance information in the fourth embodiment.

DETAILED DESCRIPTION OF THE PREFERRED EMBODIMENTS

Figure 1:
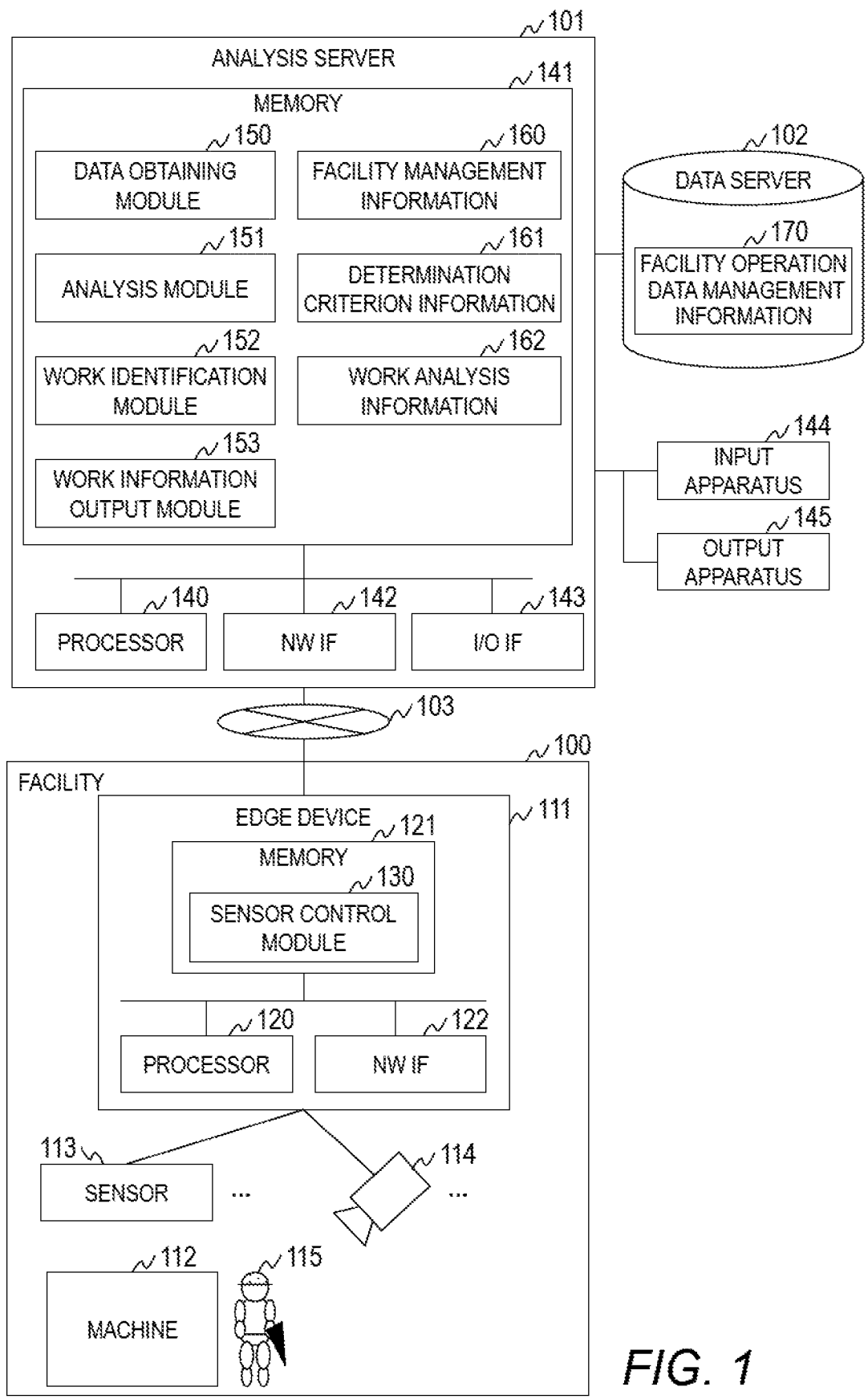
FIG. 1 is a diagram for illustrating a configuration example of a computer system according to a first embodiment of this invention.

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention.

In a configuration of this invention described below, the same or similar components or functions are assigned with the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and other metrics in order to facilitate understanding of this invention. Thus, this invention is not limited to the position, size, shape, range, and others described in, for example, the drawings.

First Embodiment

FIG. 1 is a diagram for illustrating a configuration example of a computer system according to a first embodiment of this invention.

The computer system includes a facility 100, an analysis server 101, and a data server 102.

The facility 100 and the analysis server 101 are coupled to each other via a network 103. The network 103 is, for example, a wide area network (WAN) or the Internet. This invention is not limited by the type of the network 103. The network 103 may be wired coupling or wireless coupling.

The analysis server 101 and the data server 102 are coupled to each other directly or via a network (not shown).

The facility 100 is a factory in which a product is manufactured, or the like. An edge device 111, a plurality of machines 112, a plurality of sensors 113, and a plurality of cameras 114 are installed in the facility 100. In the facility 100, a worker 115 performs a given work. While a single edge device 111 is installed in the facility 100 in FIG. 1, a plurality of edge devices 111 may be installed.

The machines 112 are each a machine for performing a given process, for example, a pressing machine. This invention is not limited by the type and number of machines 112 installed in the facility 100.

The sensors 113 measure a value indicating the running state of the machines 112, a value indicating an environment around the machines 112, and other values, and transmit facility operation data that includes the measured values as monitoring data to the edge device 111. The sensors 113 measure values other than images, for example, sound, temperature, electric current, and distance. The sensors 113 may be installed separately from the machines 112, may be built in the machines 112, or may be installed in places abutting the machines 112. A magnet, a piece of tape, or other simple methods may be used to add a new sensor 113.

The cameras 114 each obtain an image of a given space, and transmit facility operation data that includes the image as monitoring data to the edge device 111. The sensors 113 may be attached to a single camera 114. For instance, the sensors 113 that are a temperature sensor and a depth sensor may be attached to the camera 114 that has a general-purpose interface.

The edge device 111 transmits the facility operation data obtained from the plurality of sensors 113 and the facility operation data obtained from the plurality of cameras 114 to the analysis server 101. The edge device 111 includes a processor 120, a memory 121, and a network interface 122.

The hardware configuration of the edge device 111 that is illustrated in FIG. 1 is an example, and the edge device 111 is not limited to the illustrated hardware configuration. For instance, the edge device 111 may include an I/O interface.

The processor 120 executes a program stored in the memory 121. The processor 120 operates as a function module configured to implement a specific function by executing processing as programmed by the program. In the following description, a sentence describing processing with a function module as the subject of the sentence means that a program for implementing the function module is executed by the processor 120.

The memory 121 stores a program to be executed by the processor 120 and data to be used by the program. The memory 121 includes a work area to be temporarily used by the program.

The memory 121 stores a program for implementing a sensor control module 130, which controls the sensors 113 and the cameras 114. The memory 121 may store other programs.

The sensor control module 130 is capable of controlling timing at which the facility operation data is obtained, for example.

The network interface 122 is an interface through which communication to and from another apparatus is held over a network.

The data server 102 stores various types of data and information. The data server 102 includes a processor, a memory, a network interface, and a storage apparatus (not shown). The storage apparatus is a hard disk drive (HDD), a solid-state drive (SSD), or the like that stores data on a permanent basis.

The data server 102 in the first embodiment stores the facility operation data received from the analysis server 101 in facility operation data management information 170 and, in response to a request from the analysis server 101, reads the facility operation data out of the facility operation data management information 170 to transmit the read facility operation data to the analysis server 101. Details of the data structure of the facility operation data management information 170 are described with reference to FIG. 2.

The analysis server 101 uses the facility operation data to execute processing for identifying work that is performed in the facility 100. Work identified by the analysis server 101 includes types of work that are performed by running the machines 112, for example, processing work, and types of work that are performed by the worker 115 while the machines 112 are shut down, for example, cleaning and an inspection (peripheral work).

The analysis server 101 includes a processor 140, a memory 141, a network interface 142, and an I/O interface 143. The hardware configuration of the analysis server 101 that is illustrated in FIG. 1 is an example, and the analysis server 101 is not limited to the illustrated hardware configuration. For instance, the analysis server 101 may include a storage apparatus.

The processor 140, the memory 141, and the network interface 142 are pieces of hardware similar to the processor 120, the memory 121, and the network interface 122, respectively. Programs and information stored in the memory 141 are described later.

The I/O interface 143 is an interface for coupling to an external apparatus. The analysis server 101 couples to an input apparatus 144 and an output apparatus 145 via the I/O interface 143. The input apparatus 144 is an apparatus for inputting data, a command, a request, and the like, which is, for example, a keyboard, a mouse, and a touch panel. The output apparatus 145 is an apparatus for outputting data and information that are output from the analysis server 101, which is, for example, a display and a printer.

The memory 141 stores programs for implementing a data obtaining module 150, an analysis module 151, a work identification module 152, and a work information output module 153. The memory 141 also stores facility management information 160, determination criterion information 161, and work analysis information 162.

An operating system (OS) and other similar programs are omitted in FIG. 1. The programs and information stored in the memory 141 may be stored on the data server 102. In this case, the analysis server 101 obtains the program and the information from the data server 102, and loads the obtained programs and information onto the memory 141.

The facility management information 160 is information for managing, for each of the machines 112, which are monitoring objects, an association relation of the machine 112 to a relevant sensor and a relevant camera out of the sensors 113 and cameras 114 installed in the facility 100. Details of the data structure of the facility management information 160 are described with reference to FIG. 3.

The determination criterion information 161 is information for managing a determination criterion by which work is to be identified. Details of the data structure of the determination criterion information 161 are described with reference to FIG. 4.

The work analysis information 162 is information for managing work analysis data, which is the result of processing executed by the work identification module 152. Details of the data structure of the work analysis information 162 are described with reference to FIG. 5.

The data obtaining module 150 obtains the facility operation data transmitted from the edge device 111, and transmits the obtained facility operation data to the data server 102. The data obtaining module 150 also obtains the facility operation data from the data server 102 as required. The analysis module 151 analyzes the facility operation data. The work identification module 152 identifies work that is related to the running of the facility based on the result of the analysis of the facility operation data. The work information output module 153 outputs information about the identified work.

The function modules included in the analysis server 101 may be a plurality of function modules integrated into a single function module, or may be a single function module divided into a plurality of function modules on a function-by-function basis. For instance, the work identification module 152 may include the function of the analysis module 151.

FIG. 2 is a table for showing an example of the data structure of the facility operation data management information 170 in the first embodiment.

The facility operation data management information 170 holds records each including a time 201, a sensor ID 202, a type 203, and monitoring data 204. One record corresponds to one piece of facility operation data. The record structure illustrated in FIG. 2 is an example, and the structure of the facility operation data management information 170 is not limited to the illustrated record structure.

In each record, a field for the time 201 stores a point in time. The point in time stored as the time 201 is, for example, the time of measurement of a value by the relevant sensor 113, the time of obtainment of an image by the relevant camera 114, or the time of generation of the piece of facility operation data.

A field for the sensor ID 202 stores identification information of one of the sensors 113 or one of the cameras 114 that has generated the piece of facility operation data.

A field for the type 203 stores information that indicates the type of monitoring data included in the piece of facility operation data. When the piece of facility operation data is data generated by a temperature sensor, for example, "temperature" is stored as the type 203. When the piece of facility operation data is data generated by one of the cameras 114, "image" is stored as the type 203.

The type 203 is not required to be included in the record when the data type can be determined from the sensor ID 202.

A field for the monitoring data 204 stores monitoring data that is included in the piece of facility operation data.

FIG. 3 is a table for showing an example of the data structure of the facility management information 160 in the first embodiment.

The facility management information 160 holds records each including a sensor ID 301 and a machine 302. One record corresponds to one of the sensors 113 or one of the cameras 114. The record structure illustrated in FIG. 3 is an example, and the structure of the facility management information 160 is not limited to the illustrated record structure.

In each record, a field for the sensor ID 301 is the same as the field for the sensor ID 202. A field for the machine 302 stores identification information of one of the machines 112 that is an observation object of the relevant sensor 113 or the relevant camera 114. When one sensor 113 or one camera 114 is assigned a plurality of machines 112 as observation objects, pieces of identification information of the plurality of machines 112 are stored in the field for the machine 302 in the record for this sensor 113 or camera 114.

FIG. 4 is a table for showing an example of the data structure of the determination criterion information 161 in the first embodiment.

The determination criterion information 161 holds records each including an ID 401, a machine 402, work 403, a determination criterion 404, and a priority 405. One record corresponds to one determination criterion. The record structure illustrated in FIG. 4 is an example, and the structure of the determination criterion information 161 is not limited to the illustrated record structure.

In each record, a field for the ID 401 stores identification information for uniquely identifying a determination criterion (a record) set in the determination criterion information 161.

A field for the machine 402 stores identification information of one of the machines 112 for which the determination criterion is provided. The machine 402 is used as information for identifying which piece of facility operation data is to be used in work identification based on the determination criterion.

In a record defining a determination criterion for work that involves coordination of a plurality of machines 112, pieces of identification information of the plurality of machines 112 are stored in the field for the machine 402.

A field for the work 403 stores the type of work.

A field for the determination criterion 404 stores a determination criterion. Information of a determination criterion defined based on the facility operation data or on the result of an analysis of the facility operation data is stored as the determination criterion 404. For example, a condition expression is stored as the determination criterion 404.

In the first embodiment, a determination criterion for identifying the running state of one of the machines 112 is defined based on monitoring data that is obtained by the relevant sensor 113. A determination criterion for identifying the shutdown state of the machine 112 and a determination criterion for identifying work that has been performed during the shutdown state of the machine 112 are defined based on monitoring data that is obtained from the relevant camera 114. The determination criteria may each use monitoring data obtained from the camera 114 and monitoring data obtained from the sensor 113.

A field for the priority 405 stores a priority level indicating the place of the determination criterion in selection order. A numeric character is stored as the priority 405 of the first embodiment. In this case, "1" is the highest priority level. When there is no particular need to take the order of determination into account, the field for the priority 405 may be blank, or the same value may be set as the priority 405 for every determination criterion.

FIG. 5 is a table for showing an example of the data structure of the work analysis information 162 in the first embodiment.

The work analysis information 162 holds records each including an ID 501, a machine 502, work 503, a period 504, and a sensor ID 505. One record corresponds to one piece of work analysis data. The record structure illustrated in FIG. 5 is an example, and the structure of the work analysis information 162 is not limited to the illustrated data structure.

In each record, a field for the ID 501 stores identification information for uniquely identifying a piece of work analysis data (a record).

A field for the machine 502 stores identification information of one of the machines 112 that is related to identified work. In the case of work to which a plurality of machines 112 are related, pieces of identification information of the plurality of machines 112 are stored in the field for the machine 502.

A field for the work 503 stores the type of the identified work.

A field for the period 504 stores a period during which the identified work has been performed.

A field for the sensor ID 505 stores pieces of identification information of the sensors 113 and the cameras 114 that have generated the facility operation data referred to in the identification of the work.

Figure 6:
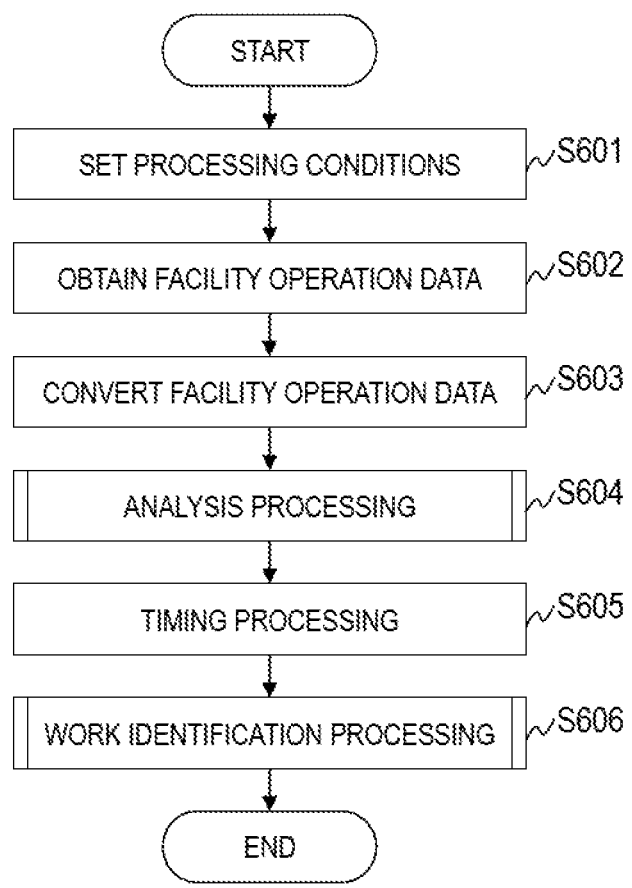
FIG. 6 is a flow chart for illustrating work analysis processing to be executed by an analysis server in the first embodiment.

FIG. 6 is a flow chart for illustrating work analysis processing to be executed by the analysis server 101 in the first embodiment.

The analysis server 101 executes the work analysis processing described below in a case where an analysis request is received via the input apparatus 144, or periodically.

The analysis server 101 sets processing conditions (Step S601). Specifically, processing described below is executed.

(Processing A1) The analysis module 151 selects at least one of the machines 112 as an analysis object. In a case where an analysis request specifying at least one of the machines 112 is received, the analysis module 151 selects the specified machine 112 as a member of a target machine group. In a case where no particular machine 112 is specified, the analysis module 151 selects all machines 112 in the facility 100 as members of a target machine group.

(Processing A2) The analysis module 151 sets a processing period. In a case where an analysis request specifying a period is received, the analysis module 151 sets the specified period as the processing period. In a case where no particular period is specified, the analysis module 151 sets the processing period by following a given rule. For example, the analysis module 151 sets a one-month period counted back from the present as the processing period.

(Processing A3) The analysis module 151 sets the target machine group and the processing period as processing conditions. This concludes the description on the processing of Step S601.

The analysis server 101 next obtains the facility operation data from the data server 102 based on the processing conditions (Step S602).

Specifically, the analysis module 151 outputs a data read request in which identification information of at least one of the machines 112 and a period are set based on the processing conditions to the data obtaining module 150. The data obtaining module 150 transmits the data read request to the data server 102 to obtain the facility operation data. The data obtaining module 150 temporarily stores the obtained facility operation data in the work area.

The analysis server 101 next converts the obtained facility operation data (Step S603).

In a case where the facility operation data includes monitoring data that is an image, for example, the analysis module 151 executes such processing as resizing, masking, noise removal, and format conversion. In a case where the facility operation data includes monitoring data that is a value, the analysis module 151 executes such processing as filtering and fast Fourier transform.

The analysis server 101 next executes analysis processing with the use of the converted facility operation data (Step S604).

Specifically, the analysis module 151 executes the analysis processing and stores the result of the analysis in the work area in association with the facility operation data. Details of the analysis processing are described with reference to FIG. 7.

The analysis server 101 next executes timing processing for aligning measurement intervals of the facility operation data (Step S605).

Specifically, the work identification module 152 aligns measurement intervals of the facility operation data by interpolation, prediction, thinning, or the like. The processing for aligning measurement intervals is a known technology, and a detailed description on the processing is therefore omitted.

The analysis server 101 next executes work identification processing (Step S606), and then ends the work analysis processing. Details of the work identification processing are described with reference to FIG. 9.

Figure 7:
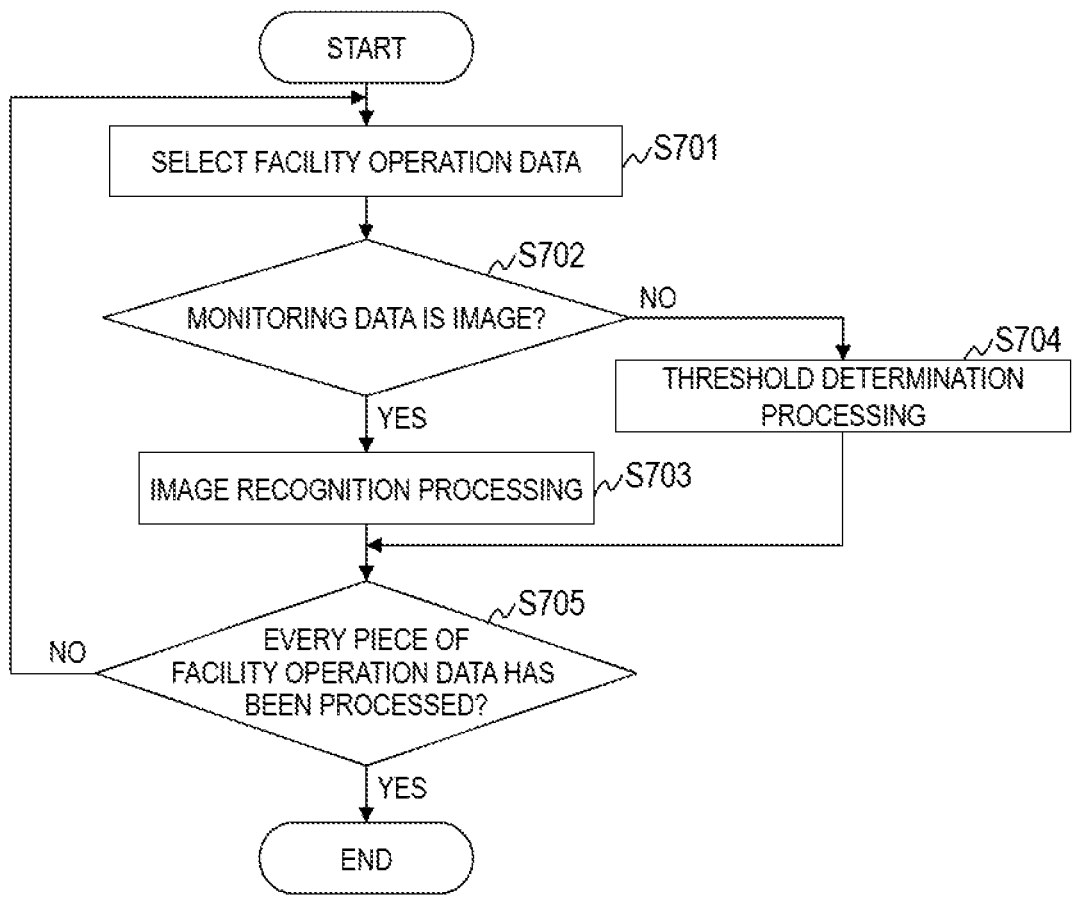
FIG. 7 is a flow chart for illustrating an example of analysis processing to be executed by the analysis server in the first embodiment.
Figure 8:
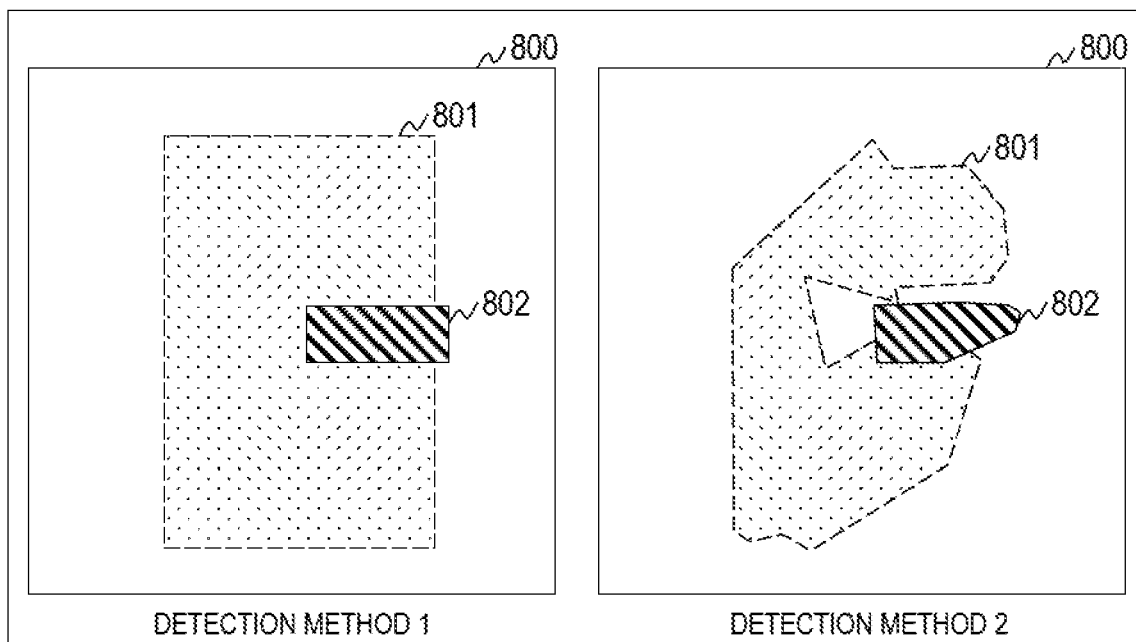
FIG. 8 is a diagram for illustrating an example of a result of image recognition processing executed by the analysis server in the first embodiment.

FIG. 7 is a flow chart for illustrating an example of the analysis processing to be executed by the analysis server 101 in the first embodiment. FIG. 8 is a diagram for illustrating an example of the result of image recognition processing executed by the analysis server 101 in the first embodiment.

The analysis module 151 selects target facility operation data from pieces of facility operation data stored in the work area (Step S701). For example, the analysis module 151 selects target facility operation data in chronological order.

The analysis module 151 next determines whether monitoring data that is included in the target facility operation data is an image (Step S702).

In a case of determining that the monitoring data that is included in the target facility operation data is an image, the analysis module 151 executes image recognition processing (Step S703). The analysis module 151 then proceeds to Step S705. Specifically, processing described below is executed.

(Processing B1) The analysis module 151 executes processing for detecting the machines 112, the worker 115, a tool, and the like that are objects included in the image. For example, such a recognition result as the one illustrated in FIG. 8 is output.

In an image 800 of FIG. 8, a person 801 and a tool 802 are detected as objects. A detection method 1 is a detection method in which a rectangular representing an object is extracted. A detection method 2 is a detection method in which the outline of an object is detected.

The image recognition processing uses an algorithm set in advance. The image recognition processing is a known technology, and a detailed description on the image recognition processing is therefore omitted. This invention is not limited by the algorithm of the image recognition processing.

(Processing B2) The analysis module 151 outputs a class and position (area) of each object as image analysis data. The analysis module 151 stores the image analysis data in the work area in association with the target facility operation data.

In a case where a plurality of objects are detected, the analysis module 151 may calculate the placement relation of the detected objects and the distance between every two objects out of the detected objects to include the calculated placement relation and distance in the image analysis data. In this case, the analysis module 151 may use the facility operation data that is obtained from the relevant sensor 113. This concludes the description on the processing of Step S703.

In a case of determining that monitoring data that is included in the target facility operation data is not an image, the analysis module 151 executes threshold determination processing (Step S704). The analysis module 151 then proceeds to Step S705. Specifically, processing described below is executed.

(Processing C1) The analysis module 151 compares the monitoring data (a value) to a threshold, and generates event data based on the result of the comparison.

For example, the analysis module 151 determines whether the current is greater than a first threshold and, in case where the current exceeds the first threshold, generates event data that indicates that the machine 112 of interest is in operation.

(Processing C2) The analysis module 151 stores the event data in the work area in association with the target facility operation data.

An algorithm in which a threshold and a comparison method are defined for each type of monitoring data is set in advance. This concludes the description on the processing of Step S704.

In Step S705, the analysis module 151 determines whether every piece of facility operation data has been processed (Step S705).

In a case of determining that not every piece of facility operation data has been processed, the analysis module 151 returns to Step S701 to execute the same processing.

In a case of determining that every piece of facility operation data has been processed, the analysis module 151 ends the analysis processing.

Figure 9:
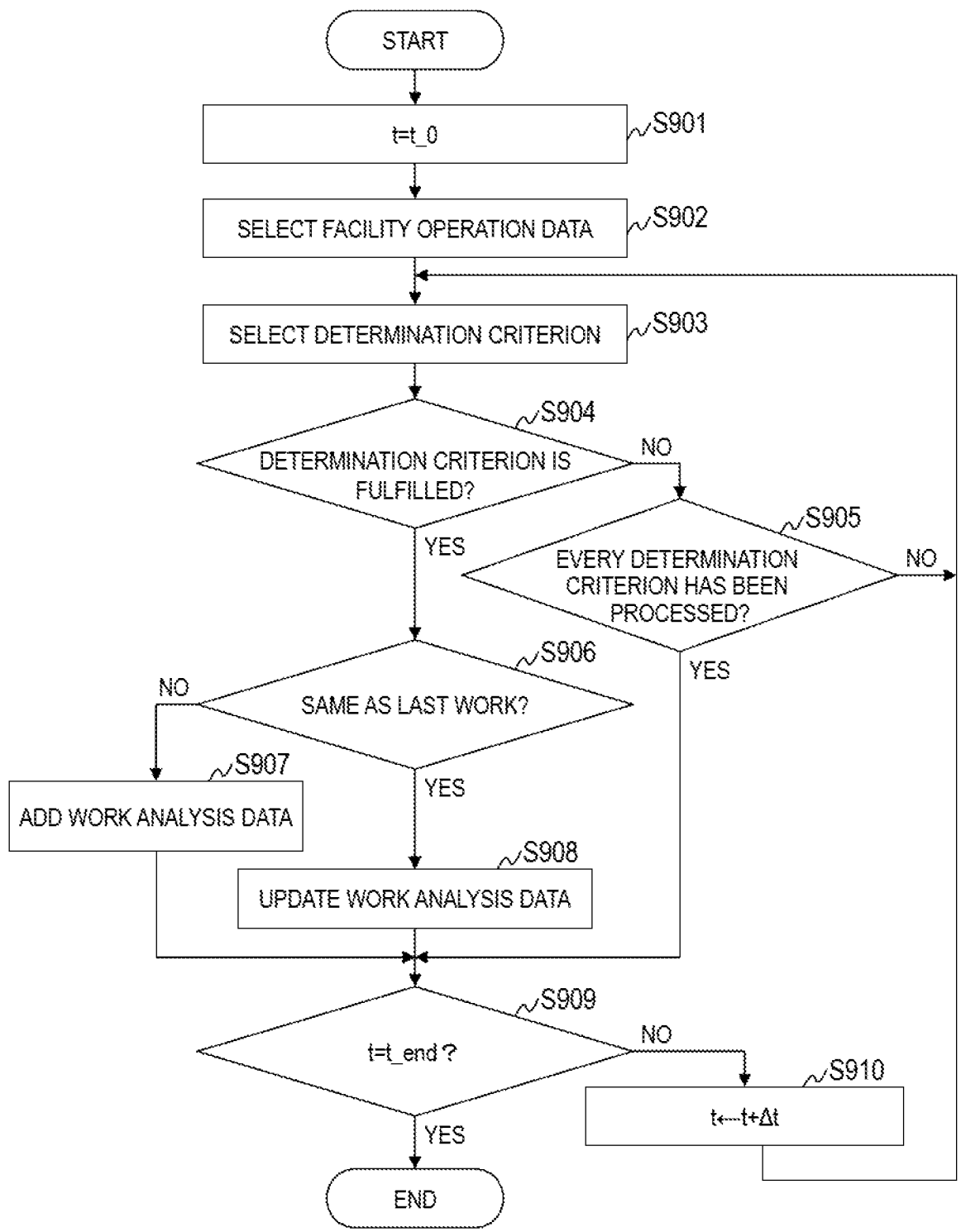
FIG. 9 is a flow chart for illustrating an example of work identification processing to be executed by the analysis server in the first embodiment.

FIG. 9 is a flow chart for illustrating an example of the work identification processing to be executed by the analysis server 101 in the first embodiment.

The work identification module 152 sets an initial time t 0 as a time variable t (Step S901). The initial time t 0 is the oldest time out of times of the obtained facility operation data. The latest time out of the times of the obtained facility operation data is set as an end time t end.

The work identification module 152 next selects a piece of facility operation data whose time 201 matches the value of the time variable t (Step S902). In this step, the work identification module 152 identifies the machine 112 that is a target by referring to the facility management information 160 with the sensor ID 202 in the facility operation data as a search key.

The work identification module 152 next refers to the determination criterion information 161 to select a determination criterion related to the target machine 112 (Step S903).

Specifically, the work identification module 152 selects a determination criterion in descending order of priority. In a case where no particular priority is set, the work identification module 152 may select records from the top downwards, or may select records at random.

The work identification module 152 next determines whether the selected determination criterion is fulfilled, based on image analysis data or event data that is associated with the selected facility operation data (Step S904).

In a case of determining that the selected determination criterion is not fulfilled, the work identification module 152 determines whether every determination criterion related to the target machine 112 has been processed (Step S905).

In a case of determining that not every determination criterion related to the target machine 112 has been processed, the work identification module 152 returns to Step S903 to execute the same processing.

In a case of determining that every determination criterion related to the target machine 112 has been processed, the work identification module 152 proceeds to Step S909.

In a case where it is determined in Step S904 that the selected determination criterion is fulfilled, the work identification module 152 determines whether work that is associated with the determination criterion is the same as work that has been identified the last time (Step S906).

Specifically, the work identification module 152 refers to the work analysis information 162 to determine whether work that is stored as the work 503 in the record currently being updated matches the identified work. In a case where the work associated with the determination criterion is determined as different from the work identified the last time, the work identification module 152 adds work analysis data to the work analysis information 162 (Step S907), and then proceeds to Step S909. Specifically, processing described below is executed.

(Processing D1) The work identification module 152 adds a record to the work analysis information 162, and sets record identification information as the ID 501 in the added record.

(Processing D2) In the added record, the work identification module 152 sets identification information of the target machine 112 as the machine 502, and sets the work that is associated with the determination criterion as the work 503.

(Processing D3) The work identification module 152 sets the value of the time variable t as the start time of a period in the field for the period 504 of the added record.

(Processing D4) The work identification module 152 sets the value of the sensor ID 202 of the selected facility operation data as the sensor ID 505 in the added record. This concludes the description on the processing of Step S907.

In a case where the work associated with the determination criterion is determined as a match to the work identified the last time, the work identification module 152 updates the work analysis data in the work analysis information 162 (Step S908), and then proceeds to Step S909. Specifically, processing described below is executed.

(Processing E1) The work identification module 152 searches for a record in which a combination of values stored as the machine 502 and the work 503 matches the combination of the identification information of the target machine 112 and the work that is associated with the determination criterion.

(Processing E2) The work identification module 152 sets the value of the time variable t as the end time of a period in the field for the period 504 of the record found as a result of the search. In a case where the end time is already set, the set end time is overwritten with the value of the time variable t.

(Processing E3) The work identification module 152 sets the value of the sensor ID 202 of the selected facility operation data as the sensor ID 505 in the added record. This concludes the description on the processing of Step S908.

In Step S909, the work identification module 152 determines whether the time variable t matches t end (Step S909).

In a case of determining that the time variable t does not match t end, the work identification module 152 sets a time that is obtained by adding a measurement interval Δt to the value of the time variable t as the time variable t (Step S910). The work identification module 152 then returns to Step S903 to execute the same processing. The measurement interval Δt indicates a minimum interval between times of the facility operation data after the timing processing is executed.

In a case of determining that the time variable t matches t end, the work identification module 152 ends the work identification processing.

Figure 10:
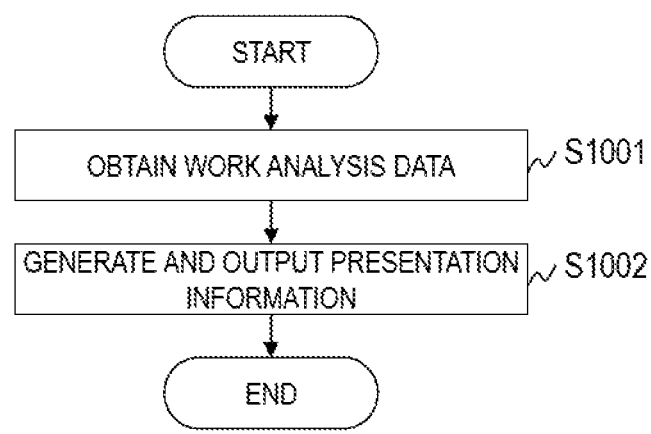
FIG. 10 is a flow chart for illustrating an example of presentation processing to be executed by the analysis server in the first embodiment.
Figure 11:
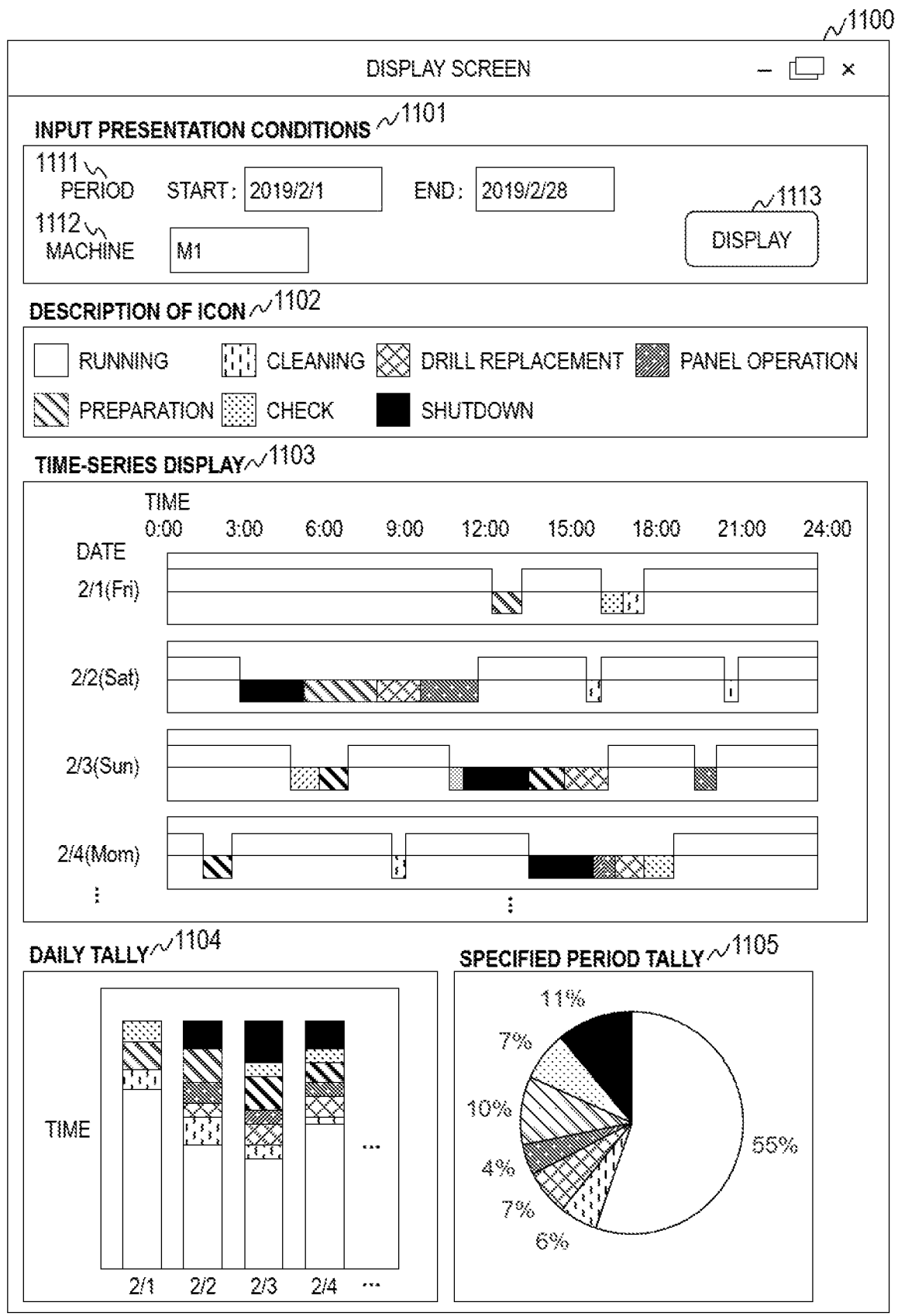
FIG. 11 is a diagram for illustrating an example of a screen to be displayed based on presentation information output from the analysis server in the first embodiment.

FIG. 10 is a flow chart for illustrating an example of presentation processing to be executed by the analysis server 101 in the first embodiment. FIG. 11 is a diagram for illustrating an example of a screen to be displayed based on presentation information output from the analysis server 101 in the first embodiment.

The analysis server 101 starts presentation processing described below in a case where a presentation request is received. The presentation request is transmitted with the use of a display screen 1100 illustrated in FIG. 11. The display screen 1100 is described.

The display screen 1100 is a screen displayed on, for example, the output apparatus 145, and includes a presentation condition input section 1101, an icon description section 1102, a time-series display section 1103, a daily tally display section 1104, and a specified period tally display section 1105. The sections included in the display screen 1100 are an example, and the display screen 1100 is not limited to this example. The display screen 1100 may include other sections (not shown) and may not include some of the sections described above.

The presentation condition input section 1101 is a section in which presentation conditions for specifying work analysis data to be presented are input. The presentation condition input section 1101 includes a period field 1111, a machine field 1112, and a "display" button 1113.

The period field 1111 is a field for specifying a period to be displayed. The machine field 1112 is a field for specifying one of the machines 112 that is to be checked. The "display" button 1113 is a button for outputting a presentation request. In a case where a user operates the "display" button 1113, a presentation request that includes values set in the period field 1111 and the machine field 1112 as presentation conditions is transmitted.

The icon description section 1102 is a section in which an example of icons corresponding to types of work is displayed.

The time-series display section 1103 is a section in which daily work analysis data of the machine 112 specified in the machine field 1112 is displayed in time series. Work related to the running is displayed in a top half and other types of work are displayed in a bottom half. The daily tally display section 1104 is a section in which a graph for showing the proportions of types of work in a day is displayed. The specified period tally display section 1105 is a section in which a circular graph for showing the proportions of types of work in a period that is specified in the period field 1111 is displayed.

The user can easily identify issues and areas of improvement with regard to the running of the facility by referring to the time-series display section 1103, the daily tally display section 1104, and the specified period tally display section 1105.

In a case where the analysis server 101 can access information used to manage a work schedule, a work shift, and the like in the facility 100, information indicating the specifics of work may be included in the displayed time-series information and statistical information. The analysis server 101 may also generate the time-series information and the statistical information so that the displayed time-series data and graphs are matched up with a work shift.

The display screen 1100 may be a screen capable of displaying time-series information and statistical information of a plurality of machines 112.

The description refers back to FIG. 10.

The work information output module 153 obtains a given piece of work analysis data from the work analysis information 162 (Step S1001).

Specifically, in the case of the presentation processing that is started after the end of the work analysis processing, the work information output module 153 obtains a piece of work analysis data in which the machine 502 matches the identification information of the identified machine 112 and the period 504 overlaps with the specified period.

The work information output module 153 next uses the obtained piece of work analysis data to generate presentation information, which includes data to be output as a presentation item, and outputs the presentation information (Step S1002). The work information output module 153 then ends the presentation processing.

For example, the work information output module 153 generates time-series information that indicates the flow of work related to one of the machines 112 in one day, and generates statistical information that indicates the proportions of hours worked in a week for types of work related to the machine 112.

The work information output module 153 may output facility operation data as required. For example, when a cursor is overlaid on an icon of given work in the time-series display section 1103, the work information output module 153 outputs the facility operation data of a time corresponding to the position of the cursor.

A plurality of facilities 100 may be coupled to the analysis server 101. In this case, the analysis server 101 holds the facility management information 160, the determination criterion information 161, and the work analysis information 162 for each of the facilities 100, and the data server 102 holds the facility operation data management information 170 for each of the facilities 100.

According to the first embodiment, the analysis server 101 is capable of automatically identifying work that is performed while the machines 112 are shut down, by using an image and a value other than an image. With the need to enter what work is performed during the shutdown of the machines 112 eliminated, the user's burden is reduced and incorrect input and other similar risk are avoided. This also improves the time resolution of analysis. Another advantage of the first embodiment is that the analysis server 101 enables the user to easily identify issues and areas of improvement with regard to the running of a facility by presenting time-series work analysis data to the user.

Consequently, a system and a method with which the running state of the entire facility is monitored precisely without burdening a user are accomplished.

Second Embodiment

A second embodiment of this invention differs from the first embodiment in the function configurations of the analysis server 101 and the edge device 111. A description given below on the second embodiment focuses on differences from the first embodiment.

Figure 12:
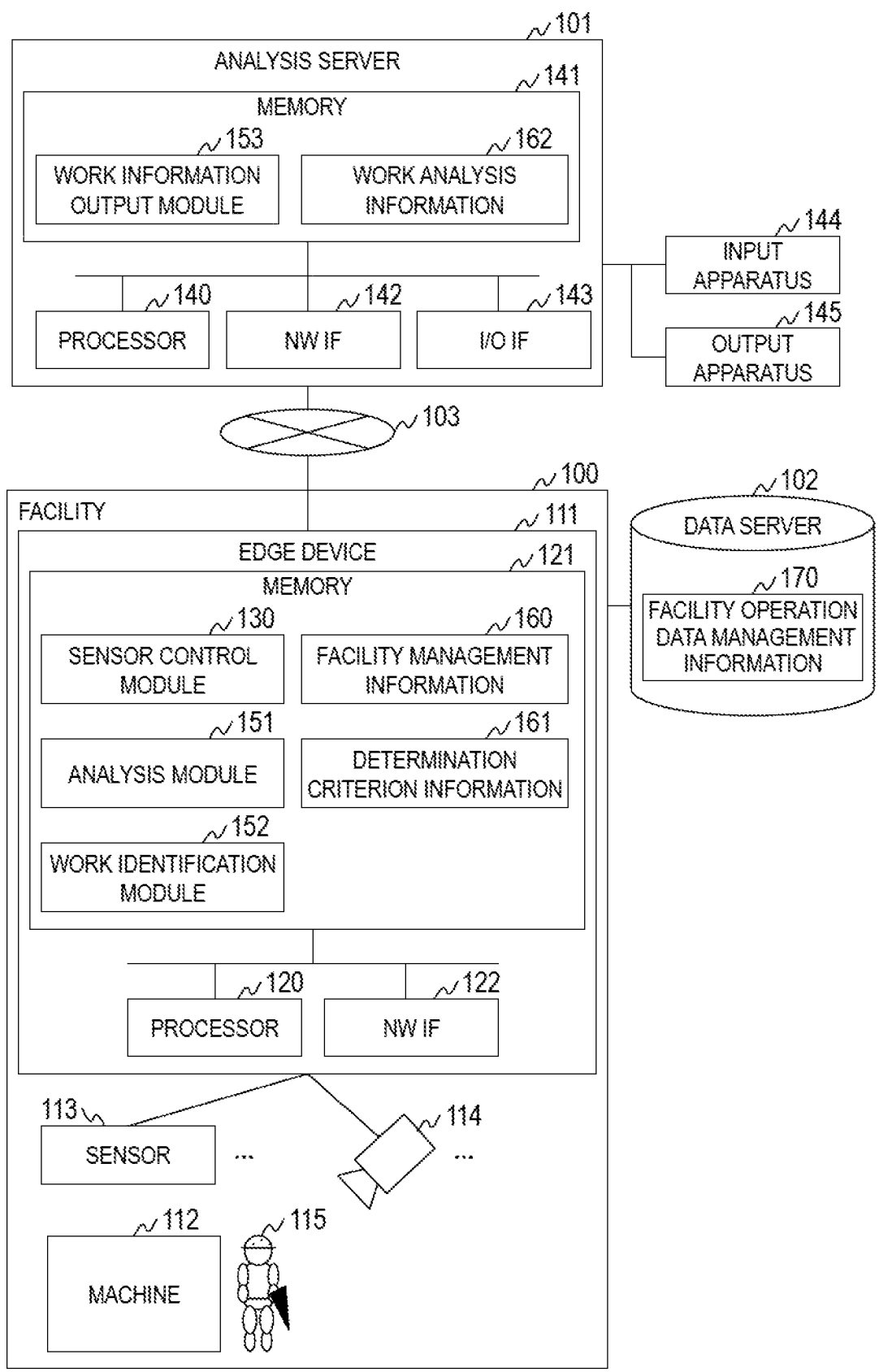
FIG. 12 is a diagram for illustrating a configuration example of a computer system according to a second embodiment.

FIG. 12 is a diagram for illustrating a configuration example of a computer system according to the second embodiment.

The configuration of the computer system according to the second embodiment is the same as in the first embodiment. In the second embodiment, however, the data server 102 is coupled to the facility 100. The configuration of the facility 100 in the second embodiment is the same as in the first embodiment. The facility operation data management information 170 that is managed by the data server 102 of the second embodiment is the same as the facility operation data management information 170 in the first embodiment. The hardware configurations of the analysis server 101 and the edge device 111 in the second embodiment are the same as in the first embodiment.

The analysis server 101 and the edge device 111 in the second embodiment have function configurations different from those in the first embodiment. Specifically, the edge device 111 in the second embodiment includes the analysis module 151 and the work identification module 152 in addition to the sensor control module 130, and holds the facility management information 160 and the determination criterion information 161. The analysis server 101 in the second embodiment includes the work information output module 153 and holds the work analysis information 162.

The edge device 111 in the second embodiment transmits facility operation data obtained from the sensors 113 and facility operation data obtained from the cameras 114 to the data server 102. The edge device 111 executes work analysis processing periodically or in a case where a request to execute the work analysis processing is received, and transmits work analysis data to the analysis server 101. The work analysis processing in the second embodiment is the same as in the first embodiment. The facility management information 160 and the determination criterion information 161 in the second embodiment are the same as those in the first embodiment.

The analysis server 101 of the second embodiment receives the work analysis data and stores the work analysis data in the work analysis information 162. The analysis server 101 executes presentation processing in a case where a presentation request is received. The presentation processing in the second embodiment is the same as in the first embodiment. The work analysis information 162 in the second embodiment is the same as the one in the first embodiment.

According to the second embodiment, there is no need to transmit and receive facility operation data over the network 103 in a case where the work analysis processing is executed, and speeding up of the work analysis processing is accordingly accomplished. In addition, the computer system according to the second embodiment uses less of the band of the network 103 because only work analysis data is transmitted to the analysis server 101.

Third Embodiment

In a third embodiment of this invention, the analysis server 101 executes learning processing for generating algorithms that are used in image recognition processing and threshold determination processing. A description given below on the third embodiment focuses on differences from the first embodiment.

Figure 13:
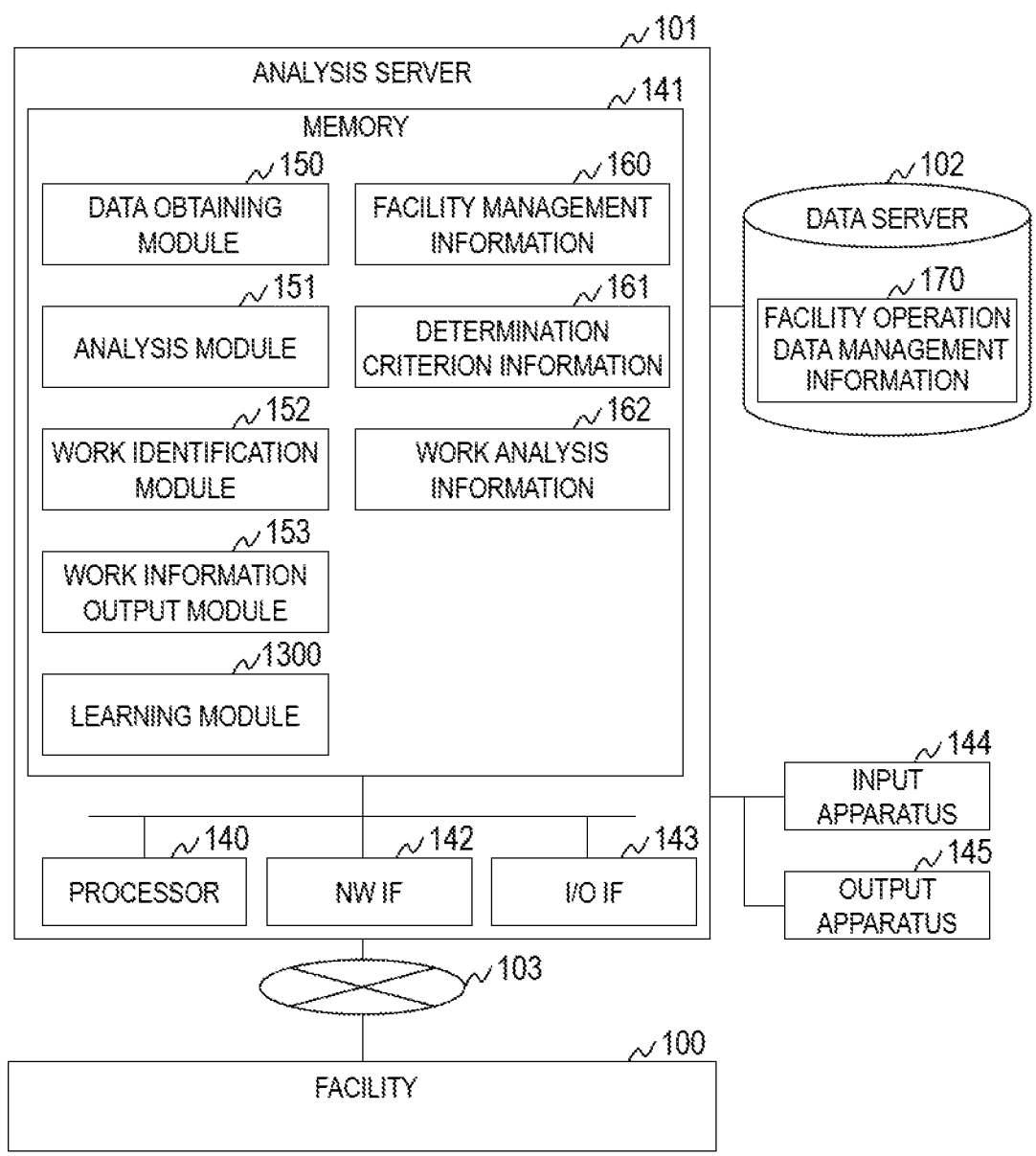
FIG. 13 is a diagram for illustrating a configuration example of a computer system according to a third embodiment.

FIG. 13 is a diagram for illustrating a configuration example of a computer system according to the third embodiment.

The configuration of the computer system according to the third embodiment is the same as in the first embodiment. The configuration of the facility 100 in the third embodiment is the same as in the first embodiment. The edge device 111 in the third embodiment has the same hardware configuration and software configuration as those of the edge device 111 in the first embodiment. The facility 100 in the third embodiment and the facility 100 in the first embodiment have the same configuration, and therefore components in the facility 100 are omitted from FIG. 13.

The facility operation data management information 170 that is managed by the data server 102 in the third embodiment is the same as the facility operation data management information 170 in the first embodiment.

The analysis server 101 in the third embodiment has the same hardware configuration as that of the analysis server 101 in the first embodiment. The software configuration of the analysis server 101 in the third embodiment differs from that in the first embodiment.

The analysis server 101 in the third embodiment includes a learning module 1300, which generates algorithms to be used in image recognition processing and threshold determination processing.

Functions of the data obtaining module 150, the analysis module 151, the work identification module 152, and the work information output module 153 in the third embodiment are the same as in the first embodiment. The facility management information 160, the determination criterion information 161, and the work analysis information 162 in the third embodiment are the same as those in the first embodiment.

The learning module 1300 executes learning processing to generate an algorithm for detecting an object in an image with the use of learning data that is made up of an image containing an object and training data (an extracted image of the object). A convolutional neural network (CNN), for example, is generated by this processing.

The learning module 1300 also executes learning processing to generate an algorithm that includes, for each event, a threshold for identifying the event and a comparison method, with the use of learning data that is made up of a value and training data (events).

According to the third embodiment, various algorithms can automatically be generated to suit the state of the facility 100, a space to be monitored, and a value to be monitored. Work identification tailored to a user's needs is thus accomplished.

Fourth Embodiment

In a fourth embodiment of this invention, the analysis server 101 presents measures for improving the productivity of the facility 100 with the use of work analysis data. A description given below on the fourth embodiment focuses on differences from the first embodiment.

Figures 14, 15A:
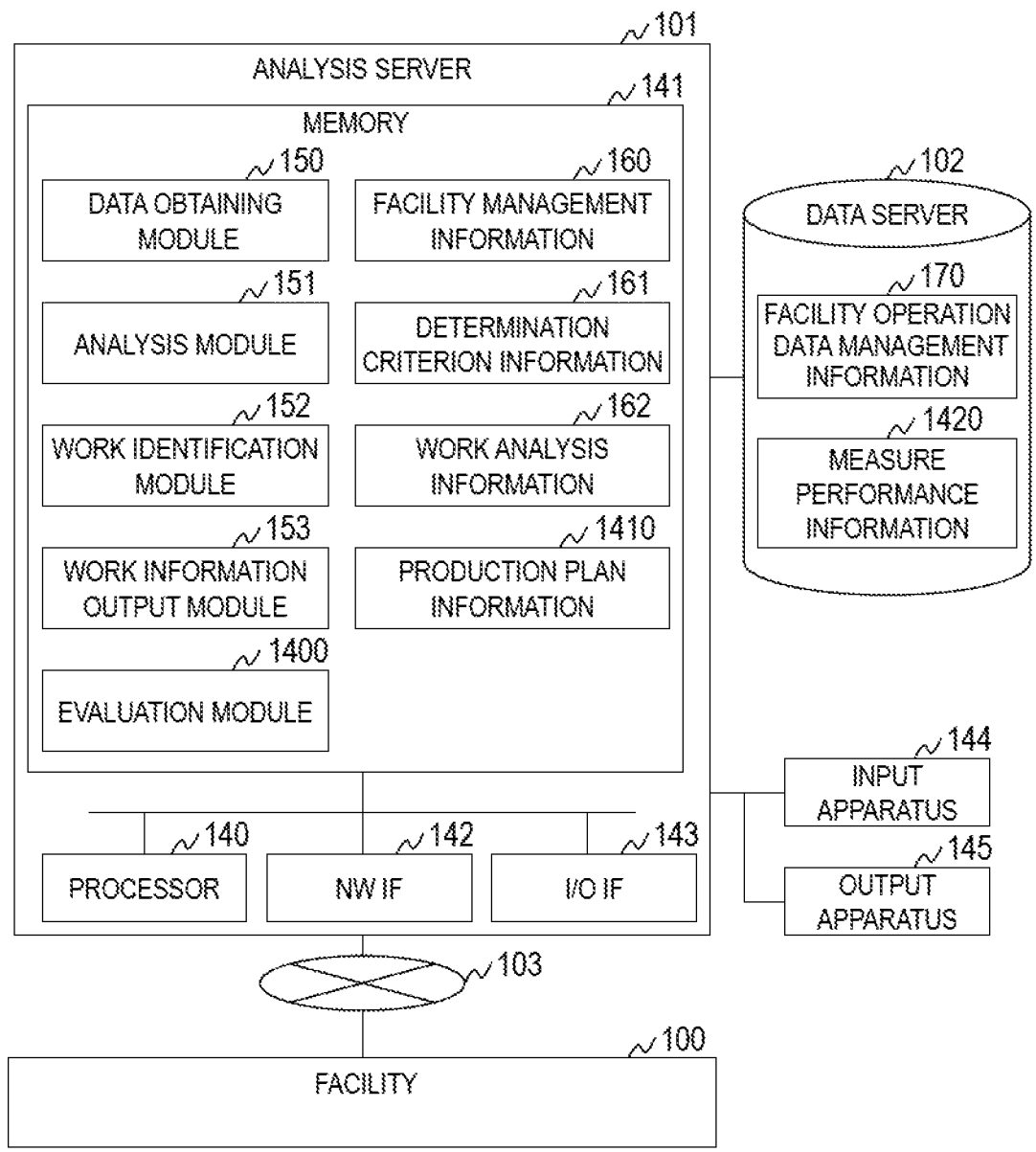

FIG. 14 is a diagram for illustrating a configuration example of a computer system according to the fourth embodiment.

The configuration of the computer system according to the fourth embodiment is the same as in the first embodiment. The configuration of the facility 100 in the fourth embodiment is the same as in the first embodiment. The edge device 111 in the fourth embodiment has the same hardware configuration and software configuration as those of the edge device 111 in the first embodiment. The facility 100 of the fourth embodiment and the facility 100 of the first embodiment have the same configuration, and therefore components in the facility 100 are omitted from FIG. 14.

In the fourth embodiment, the data server 102 holds measure performance information 1420. Details of the data structure of the measure performance information 1420 are described with reference to FIG. 16. The facility management information 170 in the fourth embodiment is the same as the one in the first embodiment.

The analysis server 101 in the fourth embodiment has the same hardware configuration as that of the analysis server 101 in the first embodiment. The software configuration of the analysis server 101 in the fourth embodiment differs from the first embodiment. The analysis server 101 of the fourth embodiment includes an evaluation module 1400, which determines whether a change for improving the productivity is required, and holds production plan information 1410 to be referred to by the evaluation module 1400. Details of the data structure of the production plan information 1410 are described with reference to FIG. 15A and FIG. 15B. Functions of the data obtaining module 150, the analysis module 151, the work identification module 152, and the work information output module 153 in the fourth embodiment are the same as in the first embodiment. The facility management information 160, the determination criterion information 161, and the work analysis information 162 in the fourth embodiment are the same as those in the first embodiment.

FIG. 15A and FIG. 15B are each a table for showing an example of the data structure of the production plan information 1410 in the fourth embodiment.

The production plan information 1410 shown in FIG. 15A holds records each including a machine 1501 and a work rate 1502. One record corresponds to one of the machines 112.

In each record, a field for the machine 1501 stores identification information of one of the machines 112. A field for the work rate 1502 stores the operating rate of the machine 112. For example, the operating rate of the machine 112 in a day is stored as the work rate 1502. This invention is not limited by what type of operating rate is stored as the work rate 1502, and the operating rate in a week or the operating rate in a month may be stored.

The production plan information 1410 shown in FIG. 15B holds records each including a machine 1511 and a schedule 1512. One record corresponds to one of the machines 112.

In each record, a field for the machine 1511 stores identification information of one of the machines 112. A group of fields for the schedule 1512 stores schedules of types of work that are related to the machine 112. The group of fields includes a field that stores work and a field that stores a period in which the work is performed. One record includes at least one row made up of a combination of work and a period.

FIG. 16 is a table for showing an example of the data structure of the measure performance information 1420 in the fourth embodiment.

The measure performance information 1420 holds records each including a time 1601, a machine 1602, an alert type 1603, a cause 1604, and a measure 1605. One record stores information about a measure taken in the past, or a feasible measure that can be taken for a phenomenon associated with an alert. The feasible measure is a measure determined in advance from the configuration and running schedule of the facility 100.

In each record, a field for the time 1601 stores the time of detection of an alert or a time at which a measure has been taken. The field for the time 1601 is blank in a record for a feasible measure.

A field for the machine 1602 stores identification information of one of the machines 112 in which the alert has been detected.

A field for the alert type 1603 stores the type of the detected alert. Examples of the alert type include dropped operating rate, work time delay, incorrect work order, and unperformed work.

A field for the cause 1604 stores the cause of the alert.

A field for the measure 1605 stores information about a measure that has been taken to remove the cause of the detected alert.

Figure 17:
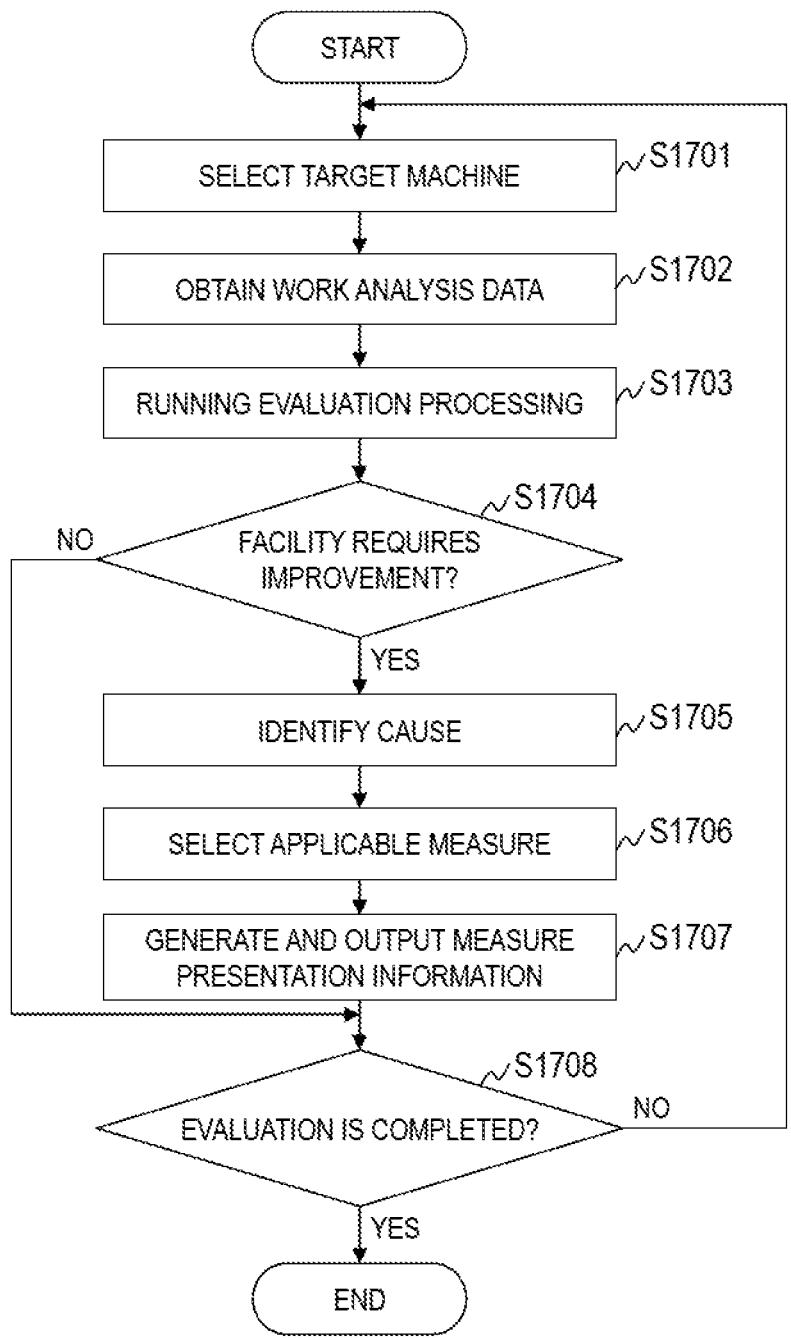
FIG. 17 is a flow chart for illustrating an example of evaluation processing to be executed by the analysis server in the fourth embodiment.

FIG. 17 is a flow chart for illustrating an example of evaluation processing to be executed by the analysis server 101 in the fourth embodiment.

The analysis server 101 executes evaluation processing described below in a case where an evaluation request is received after the completion of the work analysis processing, or periodically.

The evaluation module 1400 selects one of the machines 112 as a target machine 112 (Step S1701).

In a case where the machines 112 to be evaluated are specified, the evaluation module 1400 selects the target machine 112 from the specified machines 112. In a case where no particular machines 112 are specified, the evaluation module 1400 selects the target machine 112 from the machines 112 installed in the facility 100.

The evaluation module 1400 next obtains a piece of work analysis data that is related to the target machine 112 from the work analysis information 162 (Step S1702).

The evaluation module 1400 next uses the piece of work analysis data and the production plan information 1410 to execute running evaluation processing (Step S1703) and, from the result of the running evaluation processing, determines whether the facility 100 requires improvement (Step S1704). An example of the running evaluation processing is described. In (Processing F1) to (Processing F3), the running evaluation processing using the production plan information 1410 shown in FIG. 15A is described. In (Processing G1) to (Processing G3), the running evaluation processing using the production plan information 1410 shown in FIG. 15B is described.

(Processing F1) The evaluation module 1400 uses the piece of work analysis data to generate time-series information indicating the flow of work in a given period, and calculates the operating rate of the target machine 112. For example, time-series information indicating the flow of work in a day is generated.

(Processing F2) The evaluation module 1400 refers to the production plan information 1410 to search for a record in which the machine 1501 matches the identification information of the target machine 112, and determines whether the work rate 1502 of the found record is lower than the operating rate of the target machine 112.

(Processing F3) In a case where the work rate 1502 is lower than the operating rate of the target machine 112, the evaluation module 1400 determines that the facility 100 requires improvement. In this case, the evaluation module 1400 may present an alert indicating a dropped work rate to the user.

(Processing G1) The evaluation module 1400 uses the piece of work analysis data to generate time-series information indicating the flow of work in a given period. For example, time-series information indicating the flow of work in a day is generated.

(Processing G2) The evaluation module 1400 refers to the production plan information 1410 to search for a record in which the machine 1501 matches the identification information of the target machine 112, and generates time-series information indicating a planned flow of work based on the schedule 1512 in the found record.

(Processing G3) The evaluation module 1400 calculates an error, a deviation, or the like between the two pieces of time-series information as an evaluation value. The evaluation module 1400 executes comparison processing to compare the evaluation value against a threshold, and determines whether the facility 100 requires improvement from the result of the comparison processing. In a case of determining that the facility 100 requires to be improved, the evaluation module 1400 may present an alert indicating a dropped work rate, a work time delay, an incorrect work order, unperformed work, or the like.

In a case of determining that the facility 100 requires no improvement, the evaluation module 1400 proceeds to Step S1708.

In a case of determining that the facility 100 requires improvement, the evaluation module 1400 identifies the cause (Step S1705).

The evaluation module 1400 identifies the cause by, for example, an analysis that uses the work analysis data and the facility operation data. In this case, the evaluation module 1400 may identify the cause by referring to the cause 1604 in the measure performance information 1420 based on the result of the analysis.

The evaluation module 1400 may also present to the user an interface through which input of the cause is received.

The evaluation module 1400 next selects a measure applicable for the improvement (Step S1706).

Specifically, the evaluation module 1400 refers to the measure performance information 1420 to search for a record in which the combination of the machine 1602, the alert type 1603, and the cause 1604 matches the combination of the identification information of the target machine 112, the type of the alert, and the cause.

The evaluation module 1400 next generates measure presentation information for presenting the selected measure, and outputs the measure presentation information (Step S1707).

The evaluation module 1400 next determines whether the evaluation has been completed (Step S1708).

For example, the evaluation module 1400 determines whether every specified machine 112 or every machine 112 in the facility 100 has been processed.

In a case of determining that the evaluation has not been completed, the evaluation module 1400 returns to Step S1701 to execute the same processing.

In a case of determining that the evaluation has been completed, the evaluation module 1400 ends the evaluation processing.

According to the fourth embodiment, the analysis server 101 presents an evaluation on the productivity of the facility 100 with the use of the work analysis data, and can further present a suggestion for a measure to improve the productivity.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system, which is configured to monitor a running state of a facility in which a product is manufactured,
the facility including a plurality of machines and at least one camera,
the at least one camera being configured to generate first facility operation data, which includes an image of any given space,
the computer system comprising:
a memory storing a program; and
a processor programmed to execute the program stored in the memory, the program, when executed, causing the processor to:
obtain the first facility operation data;
identify work that is performed in the facility, based on the image included in the first facility operation data; and
output information that is generated based on a result of processing;
identify an object included in the image to generate first analysis data, which includes information about the object;
identify the work based on the first analysis data; and
generate work analysis data, which associates the identified work, a period in which the identified work has been performed, and at least one of the plurality of machines that is related to the identified work with one another;
output a visual display of at least one of time-series information that indicates illustrates a flow of the work related to one of the plurality of machines, or statistical information of the work related to the one of the plurality of machines, by using the work analysis data, to enable a user to identify issues and areas of improvement with regard to running the facility;
wherein the facility includes at least one sensor, the at least one sensor being configured to measure a value that indicates at least one of a state of the at least one of the plurality of machines and an environment around the at least one of the plurality of machines;
wherein the at least one sensor is configured to generate second facility operation data, which includes the measured value;
obtain the second facility operation data;
execute analysis processing that uses the second facility operation data to generate second analysis data, which indicates a given event in the facility; and
identify the work based on a combination of the first analysis data and the second analysis data;
wherein the computer system is configured to hold determination criterion information for storing a determination criterion, which associates the work with a combination that has, as an element, at least one of an event related to the at least one of the plurality of machines or an object; and
identify the work by referring to the determination criterion information with a combination that has, as an element, at least one of the first analysis data or the second analysis data as a search key;
wherein the work includes manufacturing the product with the plurality of machines.

2. The computer system according to claim 1,
wherein the computer system is configured to hold measure performance information for storing at least one of a measure that has been taken to improve productivity of the facility, and a measure feasible in the facility, and
wherein the processor is programmed to identify work that requires improvement based on the time-series information, identify an applicable measure based on the measure performance information, and output information about the identified measure.

3. The computer system according to claim 1,
wherein the determination criterion has an order of priority set thereto, and
wherein the processor is programmed to select the determination criterion to be used, in the order of priority.

4. The computer system according to claim 1, further comprising:
an edge device, which couples the at least one sensor and the at least one camera to each other; and
a server, which is coupled to the edge device, and which is configured to accumulate the work analysis data.

5. The computer system according to claim 1, further comprising a server, which couples the at least one sensor and the at least one camera to each other.

6. The computer system according to claim 1, wherein the work includes a work that is performed by running the one of the plurality of machines and a work that is performed by a worker during shutdown of the one of the plurality of machines.

7. A facility monitoring method, which is executed by a computer system to monitor a facility, in which a product is manufactured, that includes a plurality of machines,
the computer system including at least one computer,
the facility including at least one camera,
the at least one camera being configured to generate first facility operation data, which includes an image of any given space,
the facility monitoring method including:
a first step of obtaining, by the at least one computer, the first facility operation data;
a second step of identifying, by the at least one computer, an object that is included in the image to generate first analysis data, which includes information about the object;
a third step of identifying, by the at least one computer, work that is performed in the facility, based on the first facility operation data;
a fourth step of generating, by the at least one computer, work analysis data, which associates the identified work, a period in which the work has been performed, and at least one of the plurality of machines that is related to the work with one another; and
a fifth step of outputting, by the at least one computer, a visual display of at least one of time-series information that indicates illustrates a flow of the work related to one of the plurality of machines, or statistical information of the work related to the one of the plurality of machines, by using the work analysis data, to enable a user to identify issues and areas of improvement with regard to running the facility;

wherein the facility includes at least one sensor, the at least one sensor being configured to measure a value that indicates at least one of a state of the at least one of the plurality of machines and an environment around the at least one of the plurality of machines, wherein the at least one sensor is configured to generate second facility operation data, which includes the measured value, wherein the first step includes a step of obtaining, by the at least one computer, the second facility operation data, wherein the second step includes a step of executing, by the at least one computer, analysis processing that uses the second facility operation data to generate second analysis data, which indicates a given event in the facility;

wherein the third step includes a step of identifying, by the at least one computer, the work based on a combination of the first analysis data and the second analysis data;

wherein the computer system is configured to hold determination criterion information for storing a determination criterion, which associates the work with a combination that has, as an element, at least one of an event related to the at least one of the by the at least one computer machines or an object;

wherein the third step includes a step of identifying, by the at least one computer, the work by referring to the determination criterion information with a combination that has, as an element, at least one of the first analysis data or the second analysis data as a search key; and wherein the work includes manufacturing the product with the plurality of machines.

8. The facility monitoring method according to claim 7, wherein the computer system is configured to hold measure performance information for storing at least one of a measure that has been taken to improve productivity of the facility, and a measure feasible in the facility, and wherein the facility monitoring method further includes;

a step of identifying, by the at least one computer, work that requires improvement, based on the time-series information; and a step of identifying, by the at least one computer, an applicable measure based on the measure performance information, and outputting information about the identified measure.

9. The facility monitoring method according to claim 7, wherein the determination criterion has an order of priority set thereto, and wherein the third step includes a step of selecting, by the at least one computer, the determination criterion to be used, in the order of priority.

10. The facility monitoring method according to claim 7, wherein the work includes a work that is performed by running the plurality of machines and a work that is performed by a worker during shutdown of the one of the plurality of machines.

* * * * *